(12) United States Patent
Burjes

(10) Patent No.: US 10,183,661 B2
(45) Date of Patent: Jan. 22, 2019

(54) VARIABLE POWER TAKE-OFF WITH ELECTRIC GENERATING CAPACITY

(71) Applicant: Deere & Company, Moline, IL (US)

(72) Inventor: Roger W. Burjes, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 360 days.

(21) Appl. No.: 15/217,237

(22) Filed: Jul. 22, 2016

(65) Prior Publication Data

US 2018/0022337 A1 Jan. 25, 2018

(51) Int. Cl.
*B60W 20/10* (2016.01)
*B60K 25/02* (2006.01)
(Continued)

(52) U.S. Cl.
CPC ............ *B60W 20/10* (2013.01); *B60K 6/365* (2013.01); *B60K 17/28* (2013.01); *B60K 25/02* (2013.01);
(Continued)

(58) Field of Classification Search
CPC .......... B60W 20/10; B60Y 2300/1888; B60Y 2200/221; B60Y 2200/92; Y10S 903/93; B60K 2025/024
See application file for complete search history.

(56) References Cited

U.S. PATENT DOCUMENTS

| 4,774,855 A | 10/1988 | Murrell et al. |
| 7,059,986 B2 * | 6/2006 | Schmidt ............... B60W 10/28 180/65.275 |

(Continued)

FOREIGN PATENT DOCUMENTS

| DE | 19749074 | 5/1999 |
| DE | 10315937 | 11/2004 |

(Continued)

OTHER PUBLICATIONS

DE102017210563.1 Search Report from the German Intellectual Property Office dated May 9, 2018 (13 pages, which includes a Statement of Relevance).

*Primary Examiner* — Sherry L Estremsky
(74) *Attorney, Agent, or Firm* — Michael Best & Friedrich LLP

(57) ABSTRACT

A power take-off system and method is provided for a vehicle that includes an internal combustion engine, an electrical generator, an electrical machine, a power take-off summing planetary and a power take-off brake. The power take-off system includes a controller and a human-machine interface. The controller is configured to receive an input from the human-machine interface to select one of a variable speed power take-off mode, an electrical power generation mode, and a full power fixed ratio power take-off mode of operation. In the variable speed power take-off mode, electrical power from the electrical generator and rotational power by the power take-off system are output, and the electrical machine receives electricity and provides rotational power. In the electrical power generation mode, the electrical generator and the electrical machine both provide electrical power. In the full power fixed ratio mode, no electrical power is provided.

18 Claims, 4 Drawing Sheets

(51) Int. Cl.
*B60K 6/365* (2007.10)
*B60W 10/06* (2006.01)
*B60W 10/08* (2006.01)
*B60W 10/196* (2012.01)
*B60K 17/28* (2006.01)

(52) U.S. Cl.
CPC ............ *B60W 10/06* (2013.01); *B60W 10/08* (2013.01); *B60W 10/196* (2013.01); *B60K 2025/024* (2013.01); *B60W 2710/0677* (2013.01); *B60W 2710/086* (2013.01); *B60W 2710/1038* (2013.01); *B60Y 2200/221* (2013.01); *B60Y 2200/92* (2013.01); *B60Y 2300/1888* (2013.01); *B60Y 2300/43* (2013.01); *B60Y 2300/60* (2013.01); *B60Y 2300/78* (2013.01); *B60Y 2400/73* (2013.01); *B60Y 2400/87* (2013.01); *Y10S 903/91* (2013.01); *Y10S 903/93* (2013.01)

(56) References Cited

U.S. PATENT DOCUMENTS

| | | | |
|---|---|---|---|
| 7,684,918 | B2 | 3/2010 | Busch et al. |
| 9,139,193 | B2 * | 9/2015 | Bissontz .................. B60K 6/48 |
| 9,260,010 | B2 | 2/2016 | Newmann |
| 2002/0042319 | A1 | 4/2002 | Otten et al. |
| 2011/0231046 | A1 * | 9/2011 | Bissontz .................. B60K 6/12 701/22 |
| 2013/0066496 | A1 | 3/2013 | Ishii |
| 2014/0026691 | A1 | 1/2014 | Huber et al. |

FOREIGN PATENT DOCUMENTS

| | | |
|---|---|---|
| DE | 102005044179 | 5/2007 |
| EP | 1205338 | 5/2002 |

\* cited by examiner

VARIABLE POWER TAKE-OFF WITH ELECTRIC GENERATING CAPACITY

BACKGROUND

The present disclosure relates to a tractor having a power takeoff and a method of controlling the power take-off and generating electricity.

SUMMARY

In one embodiment, the disclosure provides a power take-off system for controlling a power take-off output shaft of a vehicle having an internal combustion engine, an electrical generator, and an electrical machine. The power take-off system includes a controller having a processor, a memory and includes a human-machine interface. The controller is configured to receive an input from the human-machine interface to select a variable speed power take-off mode of operation or an electrical power generation mode of operation for the power take-off system. In response to selection of the variable speed power take-off mode, the controller is configured to 1) drive the electrical generator to provide electrical power to a high voltage bus and 2) provide rotational power to the power take-off output shaft. In response to selection of the electrical power generation mode, the controller is configured to operate the internal combustion engine to 1) drive the electrical generator to provide power to a high voltage bus, and 2) provide rotational power to the electrical machine so that the electrical machine provides electrical power to the high voltage bus.

In another embodiment, the disclosure provides a controller for a power take-off system of a vehicle configured to receive an input from a human-machine interface to select a variable speed power take-off mode of operation or an electrical power generation mode of operation for the power take-off system. In response to selection of the variable speed power take-off mode, the controller is configured to operate to 1) drive an electrical generator using rotational power from the internal combustion engine to provide electrical power to a high voltage bus and 2) provide rotational power to the power take-off output shaft. In response to selection of the electrical power generation mode, the controller is configured to operate to 1) drive the electrical generator using rotational power from the internal combustion engine to provide electrical power to a high voltage bus, 2) drive an electrical machine using rotational power from the internal combustion engine to provide electrical power to the high voltage bus, and 3) actuate a power take-off brake to stop rotation of the power take-off output shaft.

In another embodiment the disclosure provides a power take-off system for a vehicle having an internal combustion engine. The power take-off system includes a gear connected to an engine output shaft of the internal combustion engine, an electrical generator in communication with the engine output shaft for receiving power therefrom and an electrical machine in communication with the engine output shaft. The power take-off system further includes a power take-off planetary gear train in communication with the engine output shaft, a power take-off output shaft in communication with the power take-off planetary gear train and configured to be driven by the engine output shaft, a power take-off brake in communication with the power take-off output shaft, and a power take-off control system including a controller having a processor, a memory and a human-machine interface. The controller is configured to receive an input from the human-machine interface to select a variable speed power take-off mode of operation or an electrical power generation mode of operation for the power take-off system. In response to selection of the variable speed power take-off mode, the controller is configured to operate to 1) drive the electrical generator using rotational power from the internal combustion engine to provide electrical power to a high voltage bus and 2) provide rotational power via the power take-off planetary gear train to the power take-off output shaft. In response to selection of the electrical power generation mode, the controller is configured to operate to 1) drive the electrical generator using rotational power from the internal combustion engine to provide electrical power to a high voltage bus and 2) drive the electrical machine using rotational power from the internal combustion engine to provide electrical power to the high voltage bus, and 3) actuate a power take-off brake to stop rotation of the power take-off output shaft.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
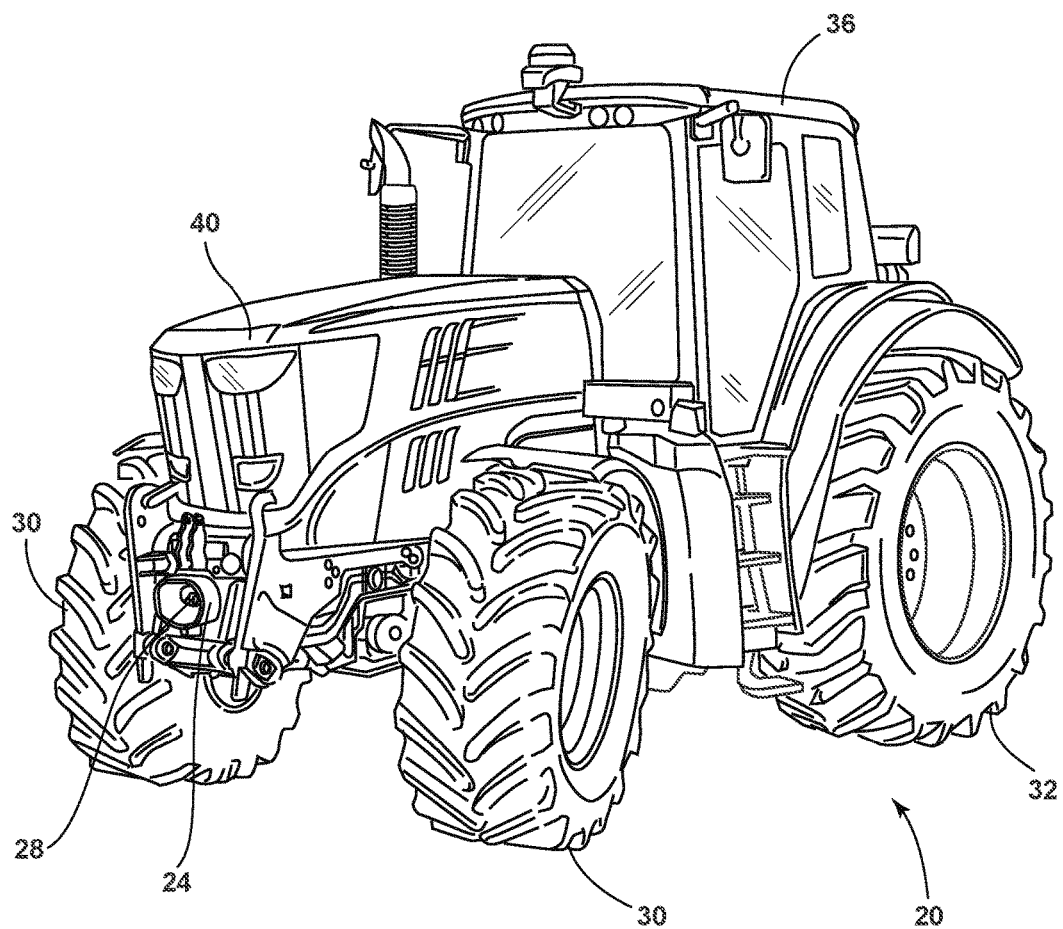
FIG. 1 illustrates a perspective view of a tractor.

FIG. 1 illustrates a tractor 20 having a power take-off (PTO) 24 that includes a power take-off (PTO) output shaft 28. The tractor 20 includes front wheels 30, rear wheels 32 and a cabin 36 for a user. The tractor 20 includes a hood bonnet 40 for enclosing an internal combustion engine.

Figure 2:
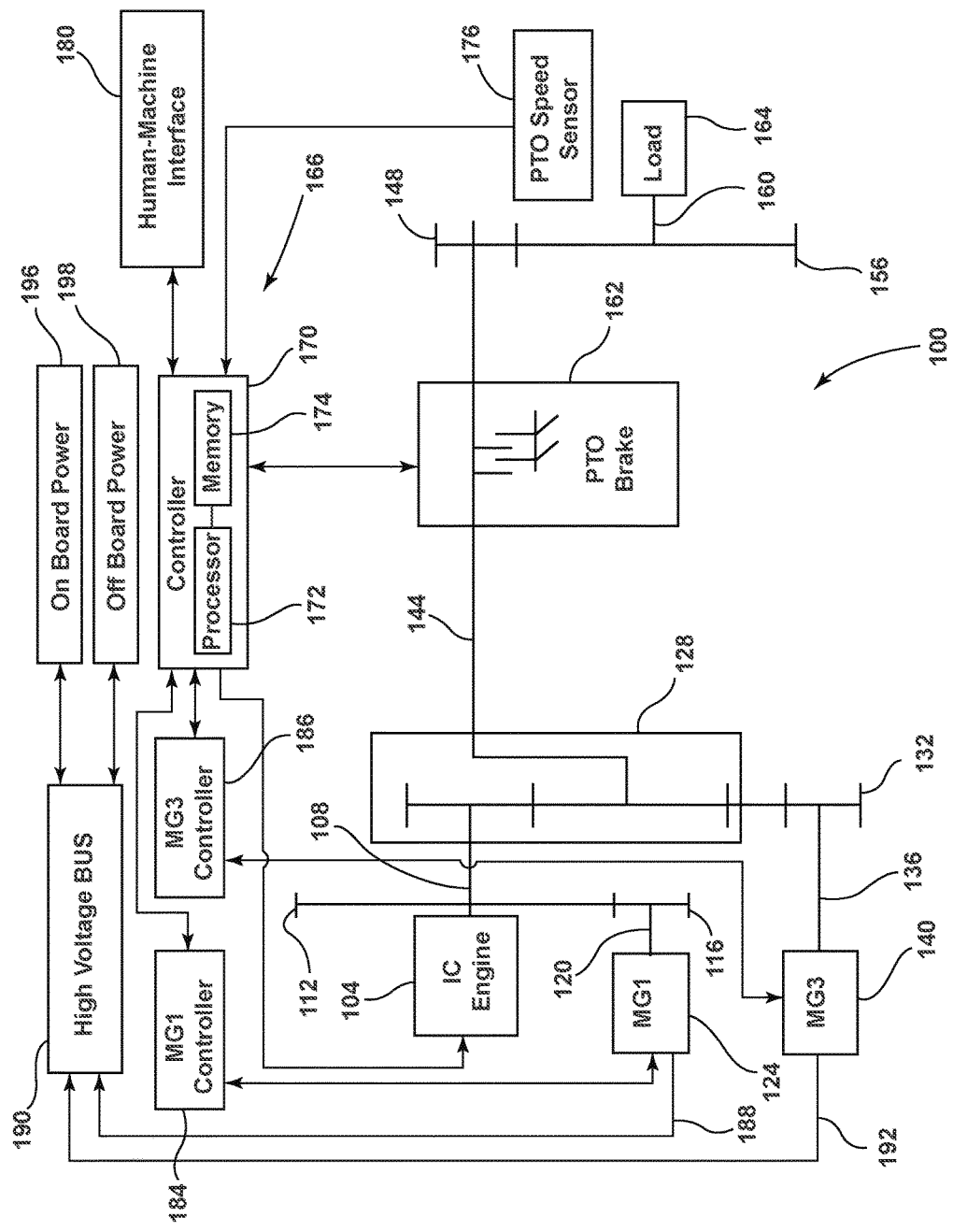
FIG. 2 is a schematic of a power take-off system of the tractor shown in FIG. 1.

FIG. 2 illustrates a power take-off system 100 that includes an internal combustion engine 104 for driving an engine shaft 108 and gear 112. The gear 112 is in communication with a gear 116 and a generator shaft 120 of an electrical generator 124 (MG1). The engine shaft 108 also connects to a power take-off (PTO) summing planetary gear train 128. The power take-off summing planetary gear train 128 is in communication with a gear 132 and a shaft 136 of an electrical machine 140 (MG3). The power take-off summing planetary gear train 128 includes an output shaft 144 that joins with a gear 148. The gear 148 is in communication with a power take-off output gear 156 joined with a power take-off output shaft 160. The power take-off output shaft 160 is selectively connected to a load 164, such as an input for a seeding device or other tool device that is separately hitched or connected to the tractor 20. Further, a power take-off brake 162 is provided to stop rotation or otherwise control the output shaft 144 that ultimately drives the power take-off output shaft 160.

The power take-off system 100 shown in FIG. 2 also includes a power take-off control system 166 that includes a controller 170 having a processor 172 and a memory 174. The processor 172 can be a microprocessor, an application specific integrated circuit (ASIC), a digital processor, or the like. The memory 174 can be a non-transitory, computer-readable memory, such as a random access memory (RAM) or a read only memory (ROM) that includes instructions for execution by the processor 172.

The controller 170 is configured to selectively control the power take-off system, including the power take-off brake 162. The power take-off control system 166 includes a power take-off speed sensor 176 for sensing rotational speed of the power take-off output shaft 160. The power take-off speed sensor 176 provides a rotational speed signal to the controller 170. Further, a human-machine interface 180 is in two-way communication with the controller 170 to provide user inputs to the power take-off control system 166 and to display the status and various operating parameters of the power take-off control system.

FIG. 2 further illustrates the controller 170 in communication with a first MG1 controller 184 that controls the electrical generator 124. The controller 170 is also in communication with a second MG3 controller 186 that controls the electrical machine 140.

A first power line 188 provides electrical power from the electrical generator 124 to a high voltage bus 190. A second power line 192 carries electrical power between the electrical machine 140 and the high voltage bus 190. The high voltage bus 190 provides on board power 196 to various devices on the tractor 20. The high voltage bus 190 also selectively provides off board power 198 to other devices, such as a seeding device or other tool device physically connected to the tractor 20.

Operation

A user provides inputs to the human-machine interface 180 to operate the power take-off system 100. More specifically, the user selects either a first mode that is a variable speed power take-off mode of operation or a second mode that is an electrical power generation mode of operation. Specifically, the power take-off system 100 provides rotational power at a rotational speed selected by a user along with some electrical generation in the variable speed power take-off mode and alternatively provides significant electrical generation without rotational power in the electrical power generation mode.

In response to selection of the variable speed power take-off mode by a user interacting with the human-machine interface 180, the human-machine interface 180 provides an output signal or value that the controller 170 receives as an input. The controller 170 controls the internal combustion engine 104 to provide rotational power via the engine shaft 108. The internal combustion engine 104 communicates via gears 112, 116 with the electrical generator 124 to generate electrical power or energy. The electrical energy or electricity is provided via the first power line 188 to the high voltage bus 190. Further, the controller 186 controls the electrical machine 140

Figure 3:
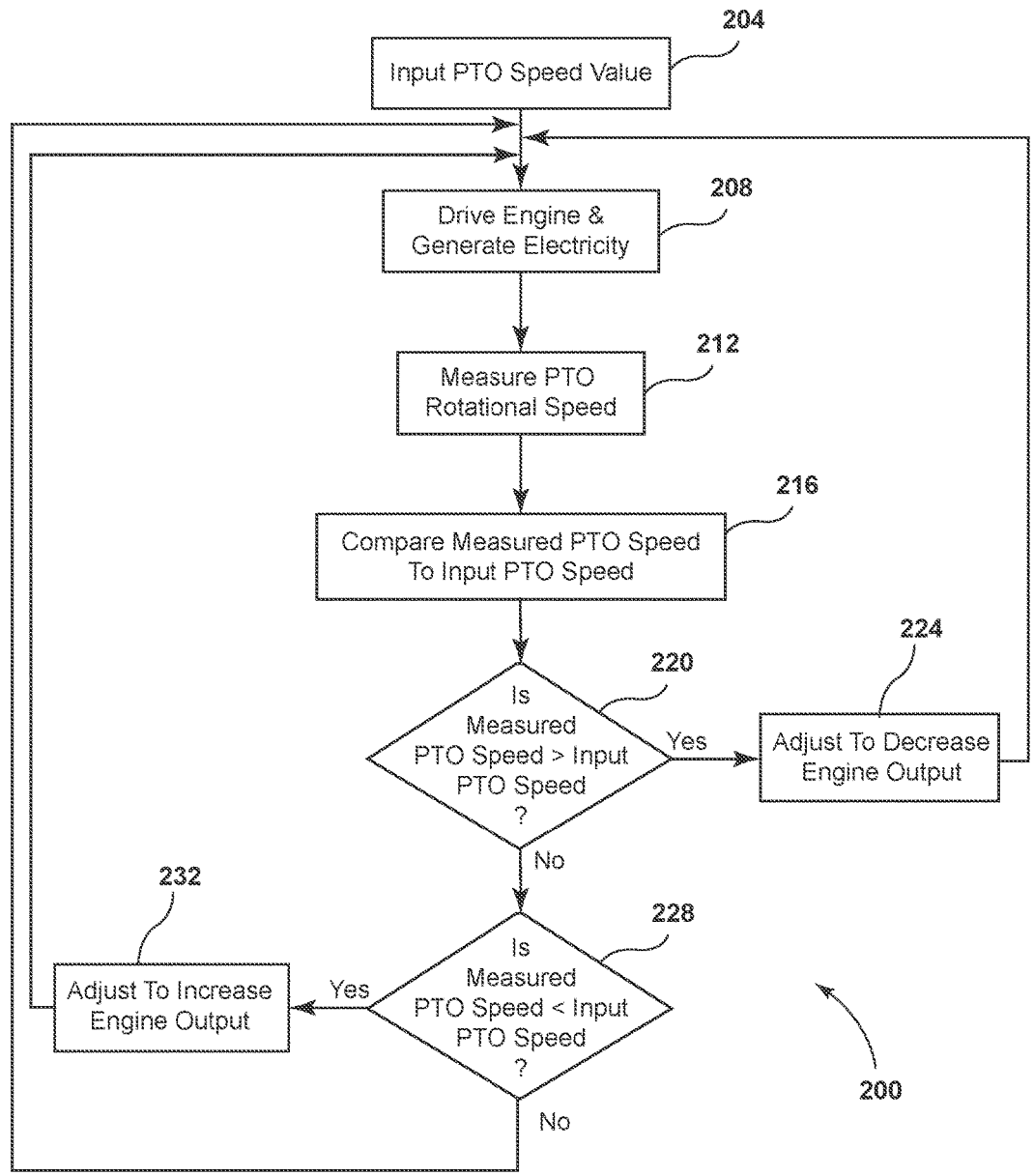
FIG. 3 is a flow chart for operation of the power take-off system shown in FIG. 2.

Specifically, and with further reference to flowchart 200 of FIG. 3, a user provides inputs to the human-machine interface 180, selecting the variable speed power take-off mode, which includes a power take-off speed value at step 204. In response to this input, the controller 170 at step 208 changes (i.e., increases or decreases) the rotational speed of the power take-off output shaft by outputting a signal to control at least one of the internal combustion engine 104 and the electricity provided to the electrical machine 140 to drive the gear 132. The output signal is based on one or more of the inputs provided to the human-machine interface 180, the electrical power provided to the electrical machine 140, and the measured rotational speed of the power take-off speed sensor 176. The electrical generator 124 concurrently generates electricity that is provided to the high voltage bus 190.

The routine advances to step 212, whereat the power take-off speed sensor 176 measures the rotational speed of the power take-off output shaft 160 and provides a measured power take-off speed value to the controller 170. At step 216, the controller compares the measured power take-off speed value with the input or selected power take-off speed value.

If the measured power take-off speed value is greater than the input power take-off speed value (step 220), the controller 170 provides at step 224 an output to adjust the rotational speed of the power take-off output shaft 160 lower by returning to step 208 and operating to decrease the engine output value and/or decrease current provided to the electrical machine 140 that provides power to drive the power take-off output shaft 160.

If the measured power take-off speed value at step 220 is not greater than the input power take-off speed value, the routine advances to step 228.

At step 228, if the measured power take-off rotational speed value is not less the input power take-off rotational speed value, the speeds are considered the same and the routine returns to step 208. The controller 170 does not generate any additional or different output for adjusting the rotational speed of the power take-off output shaft 160. Thus, the power take-off rotational speed is maintained.

At step 228, if the measured power take-off rotational speed value is less than the input power take-off rotational speed value, the routine advances to step 232. At step 232, the engine output value is incremented higher and the routine returns to step 208 and proceeds as previously described.

In the variable speed power take-off mode, the electrical machine 140 is motoring. Thus, instead of acting as a generator, the electrical machine 140 is receiving electricity from the high voltage bus 190 and acting as a motor to power or drive the power take-off summing planetary gear train 128.

The flow chart 200 is executed until the variable speed power take-off mode is deselected or another mode is selected. Besides the variable speed power take-off mode, a user may, instead, select an electrical power generation mode with the human-machine interface 180.

The power generation mode is described as follows. In response to selection of the electrical power generation mode, the human-machine interface 180 provides an output in the form of an electrical power generation mode selection input signal for the controller 170. In response, the controller 170 provides a brake signal to the power take-off brake 162, which ceases rotation of the output shaft 144. Thus, the power take-off output shaft 160 is not rotating and accordingly, no mechanical off board power is provided via the power take-off output shaft 160. Further, the controller 170 controls the controller 184 and the controller 186 so that the electrical generator 124 receives power from the gear 116 and the electrical machine 140 receives power from the gear 132, and each operates to provide electricity to the high voltage bus 190. Thus, the electrical power output for or from the tractor 20 is maximized due to the output of the electrical machine 140, in addition to the electrical generator 124.

Power Take-Off System Having Three Modes of Operation

Figure 4:
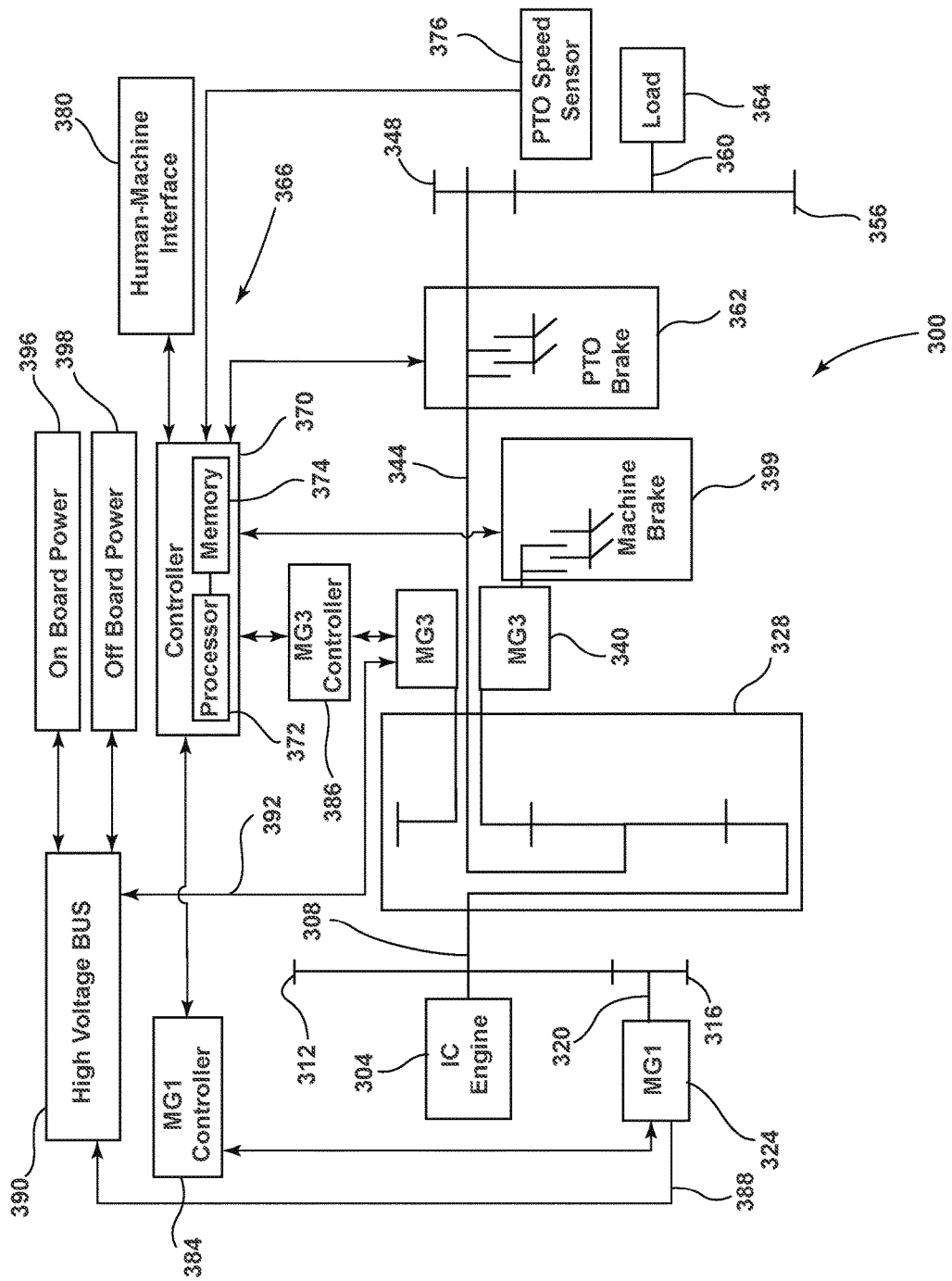
FIG. 4 is a schematic of a power take-off system having three modes of operation.

FIG. 4 illustrates another power take-off system 300 similar to the system of FIG. 2. Like elements have the same reference numeral except that the prefix is changed to "3" instead of "1". Thus, description of the entirety of elements is not necessary. Differences in the elements are as follows. As compared to the power take-off summing planetary gear train 128 illustrated in FIG. 3, the motor shaft 308 of FIG. 4 directly drives a ring gear rather than a sun gear of the gear train 328. Further, FIG. 4 illustrates a brake 399 for use with the electrical machine 340. The power take-off system 300 shown in FIG. 4 operates in a mode selected from the group consisting of a first variable speed power take-off mode, a second electrical power generation mode, and a third full power fixed ratio mode.

In the first variable speed power take-off mode of operation, the machine brake 399 is in an off position and the controller 386 controls the electrical machine 340 to provide motoring. Thus, in the first variable speed power take-off mode, a user selects a rotational power take-off speed value for the power take-off output shaft 360 and the power take-off control system 366 operates to obtain and maintain the rotational speed using the same steps as shown in FIG. 3, discussed above and which need not be repeated. The electrical generator 324 concurrently generates electrical power that is supplied to the high voltage bus 390.

In the second electrical power generation mode of operation, the brake 399 is in an off position or not actuated. The power take-off brake 362 is actuated. The controller 384 controls the electrical generator 324 and the controller 386 controls the electrical machine 340 so both generate electrical power that is provided to the high voltage bus 390. The high voltage bus 390 provides on board power 396 to the tractor 20, including to a battery of the tractor. Further, the high voltage bus 390 may selectively provide off board power 398 to a tool device or implement physically and electrically connected to the tractor 20.

The third full power fixed ratio mode of operation occurs when the controller 370 in FIG. 4 receives an input corresponding to the fixed ratio mode from the human-machine interface 380. In the full power fixed ratio mode of operation, rotational power output by the power take-off output shaft 360 at a fixed ratio is maximized. In the full power fixed ratio mode, the power take-off brake 362 is off or not actuated to enable the output of rotational power. Further, the controller 370 sets or actuates the brake 399 so that the electrical machine 340 is not generating electricity or providing a load against the transfer of power from the internal combustion engine 304 via the engine shaft 308, the power take-off summing planetary gear train 328, the gear 348 and the power take-off output gear 356 to the power take-off output shaft 360. Moreover, the electrical generator 324 can be set in an off or non-generating condition. As the electrical generator 324 and the electrical machine 340 are not driven to generate electricity, the transfer of rotational power from the internal combustion engine 304 to the power take-off output shaft 360 is maximized. The rotational power is transferred from the power take-off system 300 to a load 364 of a tool device or implement that is connected to the power take-off 24 of the tractor 20.

Alternative Arrangements

In one embodiment, the internal combustion engine 104 of the tractor 20 is a gas powered engine. In another embodiment, the internal combustion engine 104 is a diesel powered engine.

In another embodiment for the variable speed power take-off mode, instead of the electrical machine providing additional power to the power take-off, a brake (not shown) operates such that the electrical machine 140 does not provide a load to the internal combustion engine 104 or generate electrical power.

In some embodiments, the power take-off speed sensor 176 senses rotation of the output shaft 144 electromagnetically or optically. In other embodiments, the power take-off speed sensor 176 directly senses rotational speed of the power take-off output shaft 160 electromagnetically or optically.

In one embodiment, the controller 170 is a chassis controller. In another embodiment, the controller 184 is integrated within the electrical generator 124 and the controller 186 is integrated within the machine 140. In one embodiment, the controller 184 and the controller 186 are combined with, or a part of, the controller 170.

In one embodiment, the load 164 is part of an exact-emerge planter. The electrical power generation mode is used to provide off board power 198 to electric blower motors of air seeders.

While a tractor 20 is illustrated, the power take-off 24 can be provided for other types of vehicles or machines. The power take-off 24 shown at the front of the tractor 20 in FIG. 1 also can be located at the rear of the tractor or a vehicle.

Thus, the disclosure provides, among other things, a power take-off system having multiple operating modes, including an electrical power generation mode and a maximum rotational power mode. Various features and advantages of the disclosure are set forth in the following claims.

What is claimed is:

1. A power take-off system for controlling a power take-off output shaft of a vehicle having an internal combustion engine, an electrical generator, and an electrical machine, the power take-off system including a controller having a processor, a memory and a human-machine interface, the controller configured to:
   receive an input from the human-machine interface to select a variable speed power take-off mode of operation or an electrical power generation mode of operation for the power take-off system;
   in response to selection of the variable speed power take-off mode, operate the internal combustion engine to 1) drive the electrical generator to provide electrical power to a high voltage bus and 2) provide rotational power to the power take-off output shaft; and
   in response to selection of the electrical power generation mode, operate the internal combustion engine to 1) drive the electrical generator to provide power to a high voltage bus, and 2) provide rotational power to the electrical machine such that the electrical machine provides electrical power to the high voltage bus.

2. The power take-off system according to claim 1, including a power take-off speed sensor for sensing the rotational speed of the power take-off output shaft and a power take-off brake for controlling the power take-off output shaft, wherein the controller is configured to adjust the rotational speed of the power take-off output shaft by controlling at least one from the group consisting of rotational power that is output from the internal combustion engine and electrical power provided to the electrical machine.

3. The power take-off system according to claim 1, wherein, in response to selection of the variable speed power take-off mode, the controller is configured to selectively permit electrical power to the electrical machine to provide rotational power to the power take-off output shaft.

4. The power take-off system according to claim 1, wherein the controller is configured to receive an input corresponding to a full power fixed ratio mode of operation, wherein the controller is further configured to 1) operate the power take-off system such that electricity is not generated by either of the electrical generator or the electrical machine and 2) control the internal combustion engine to drive the output shaft at a full power fixed ratio.

5. The power take-off system according to claim 4, wherein a power take-off speed sensor is configured to sense rotational speed of the power take-off output shaft and provide the rotational speed to the controller, and wherein the controller is configured to control a brake such that the electrical machine does not generate electrical power during the full power fixed ratio mode.

6. The power take-off system according to claim 1, further comprising a power take-off summing planetary gear train connecting the internal combustion engine to the power take-off output shaft.

7. A controller for a power take-off system of a vehicle having an internal combustion engine, the controller configured to:
receive an input from a human-machine interface to select a variable speed power take-off mode of operation or an electrical power generation mode of operation for the power take-off system;
in response to selection of the variable speed power take-off mode, operate to 1) drive an electrical generator using rotational power from the internal combustion engine to provide electrical power to a high voltage bus and 2) provide rotational power to the power take-off output shaft; and
in response to selection of the electrical power generation mode, operate to 1) drive the electrical generator using rotational power from the internal combustion engine to provide electrical power to a high voltage bus, 2) drive an electrical machine using rotational power from the internal combustion engine to provide electrical power to the high voltage bus, and 3) actuate a power take-off brake to stop rotation of the power take-off output shaft.

8. The controller according to claim 7, including a power take-off speed sensor for sensing the rotational speed of the power take-off output shaft, wherein the controller is configured to adjust the rotational speed of the power take-off output shaft during the variable speed power take-off mode by controlling the internal combustion engine and controlling the electrical power provided to the electrical machine, which provides rotational power to the power take-off output shaft.

9. The controller according to claim 7, wherein, in response to selection of the variable speed power take-off mode, the controller is configured to selectively permit power to the electrical machine to provide rotational power to the power take-off output shaft.

10. The controller according to claim 7, wherein the controller is configured to receive an input corresponding to a full power fixed ratio mode of operation and in response operate to control the internal combustion engine to drive the power take-off output shaft at a full power fixed ratio.

11. The controller according to claim 10, wherein a power take-off speed sensor is configured to sense rotational speed of the power take-off output shaft and provide the rotational speed to the controller, and wherein the controller is configured to control a brake such that the electrical machine does not generate electric power.

12. The controller according to claim 7, wherein the controller is configured to selectively change the rotational speed of the power take-off output shaft in response to an input from the human-machine interface in the variable speed power take-off mode.

13. A power take-off system for a vehicle having an internal combustion engine, the power take-off system comprising:
a gear connected to an engine output shaft of the internal combustion engine;
an electrical generator in communication with the engine output shaft for receiving power therefrom;
an electrical machine in communication with the engine output shaft;
a power take-off planetary gear train in communication with the engine output shaft;
a power take-off output shaft in communication with the power take-off planetary gear train and configured to be driven by the engine output shaft;
a power take-off brake in communication with the power take-off output shaft; and
a power take-off control system including a controller having a processor, a memory and a human-machine interface, the controller configured to:
receive an input from the human-machine interface to select a variable speed power take-off mode of operation or an electrical power generation mode of operation for the power take-off system,
in response to selection of the variable speed power take-off mode, operate to 1) drive the electrical generator using rotational power from the internal combustion engine to provide electrical power to a high voltage bus and 2) provide rotational power via the power take-off planetary gear train to the power take-off output shaft, and
in response to selection of the electrical power generation mode, operate to 1) drive the electrical generator using rotational power from the internal combustion engine to provide electrical power to a high voltage bus, 2) drive the electrical machine using rotational power from the internal combustion engine to provide electrical power to the high voltage bus, and 3) actuate a power take-off brake to stop rotation of the power take-off output shaft.

14. The system according to claim 13, including a power take-off speed sensor for sensing the rotational speed of the power take-off output shaft, wherein the controller is configured to adjust the rotational speed of the power take-off output shaft by controlling at least one from the group consisting of the rotational power that is output from the internal combustion engine and electrical power provided to the electrical machine in the variable speed power take-off mode, and wherein the electrical machine is configured to drive the power take-off output shaft.

15. The system according to claim 13, wherein in the variable speed power take-off mode, the controller is configured to selectively permit electrical power to the electrical machine to provide rotational power to the power take-off output shaft.

16. The system according to claim 13, wherein the controller is configured to receive an input corresponding to a full power fixed ratio mode of operation, and wherein the controller is configured to control the internal combustion engine to drive the power take-off output shaft at a fixed ratio.

17. The system according to claim 16, including a power take-off speed sensor for sensing rotational speed of the power take-off output shaft and providing the rotational speed to the controller, and wherein the controller is configured to control a brake such that the electrical machine does not generate electrical power when the power take-off output shaft is driven at the fixed ratio.

18. The system according to claim 13, wherein the controller is configured to selectively change the rotational speed of the power take-off output shaft in response to an input from the human-machine interface in the variable speed power take-off mode.

* * * * *